July 25, 1967  R. F. BALDWIN  3,332,458
WOOD TURNING LATHE ATTACHMENT
Filed June 5, 1964  6 Sheets-Sheet 1

INVENTOR.
RICHARD F. BALDWIN
BY John Cyril Malloy
ATTORNEY.

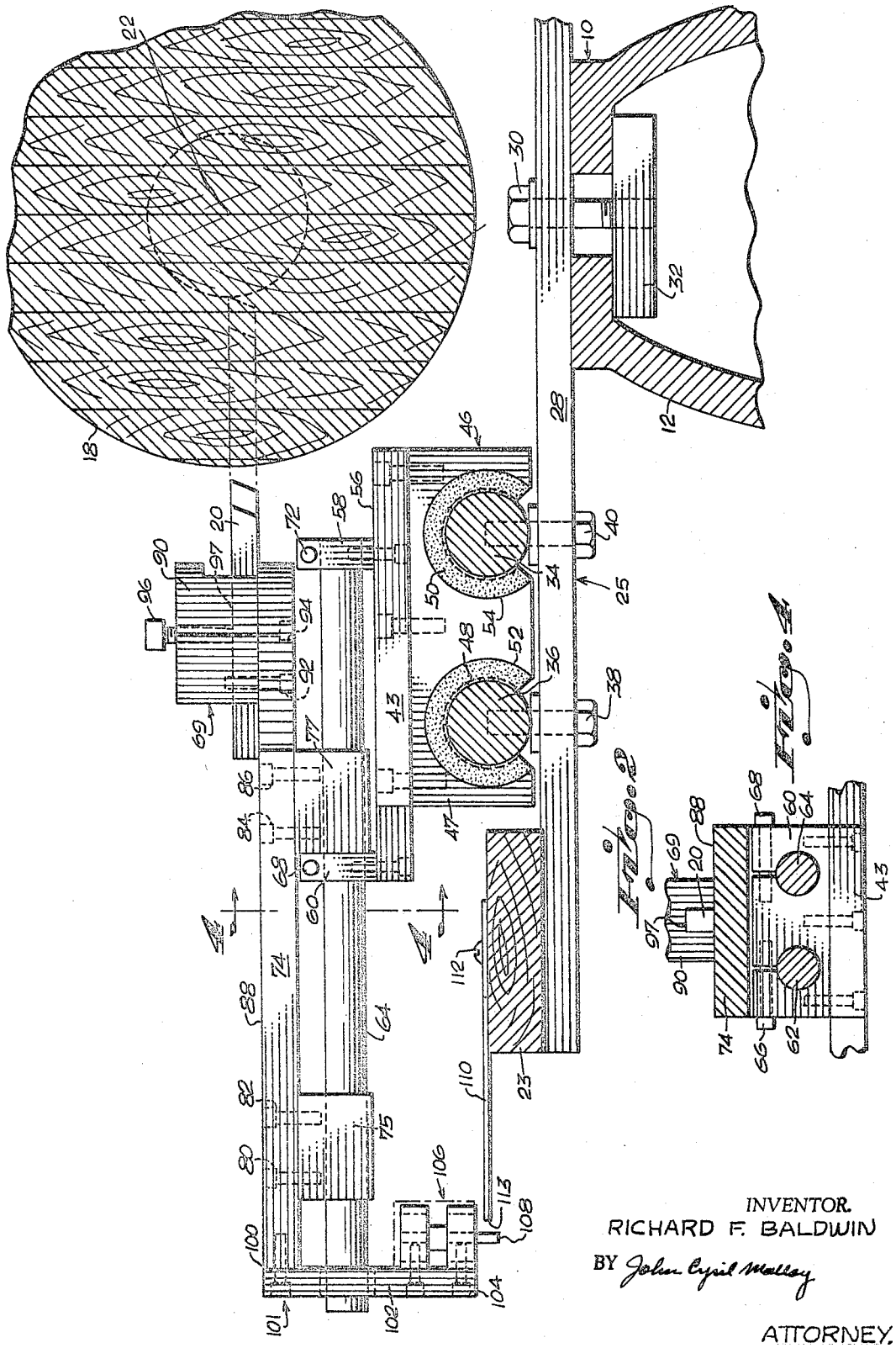

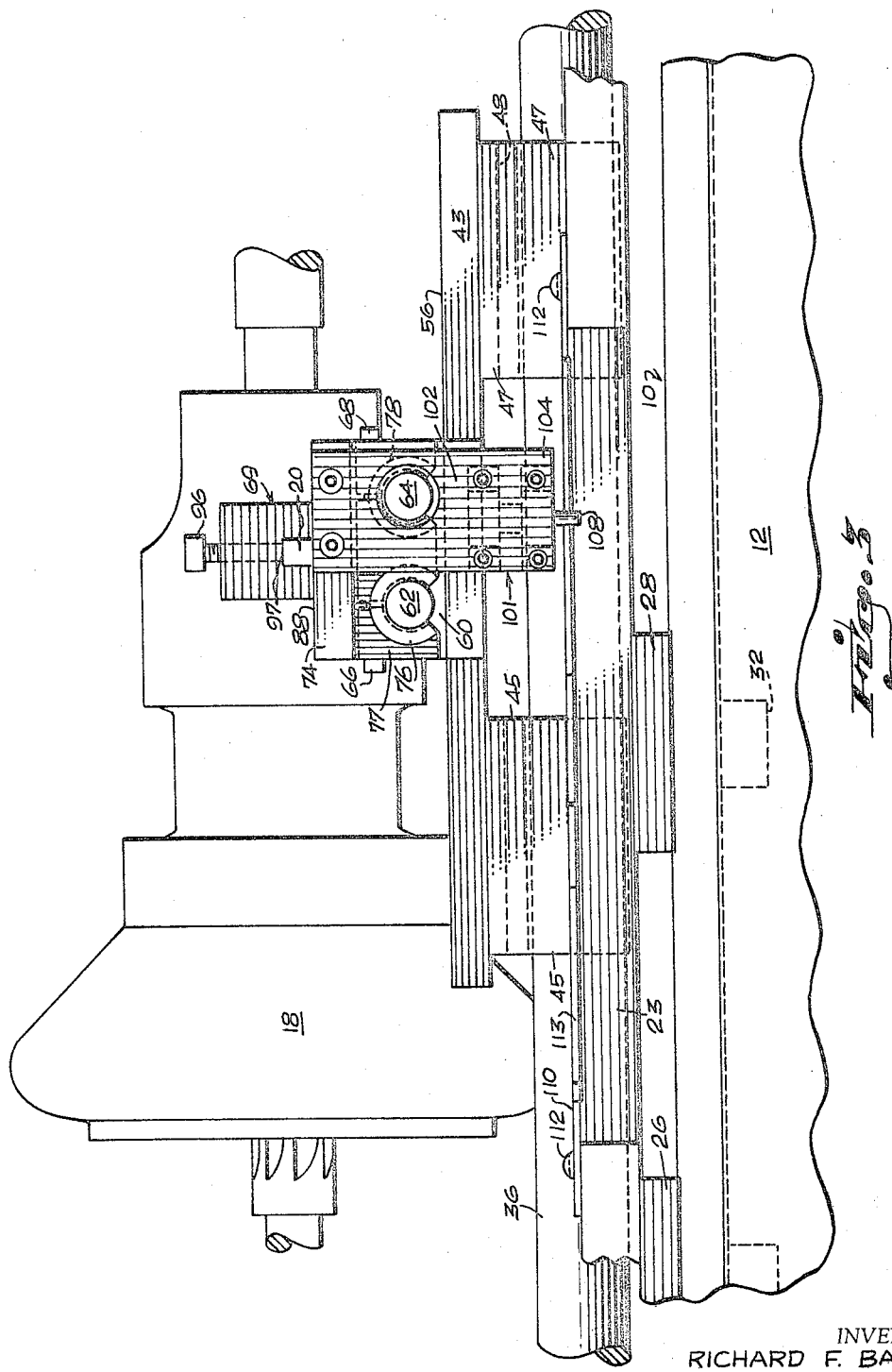

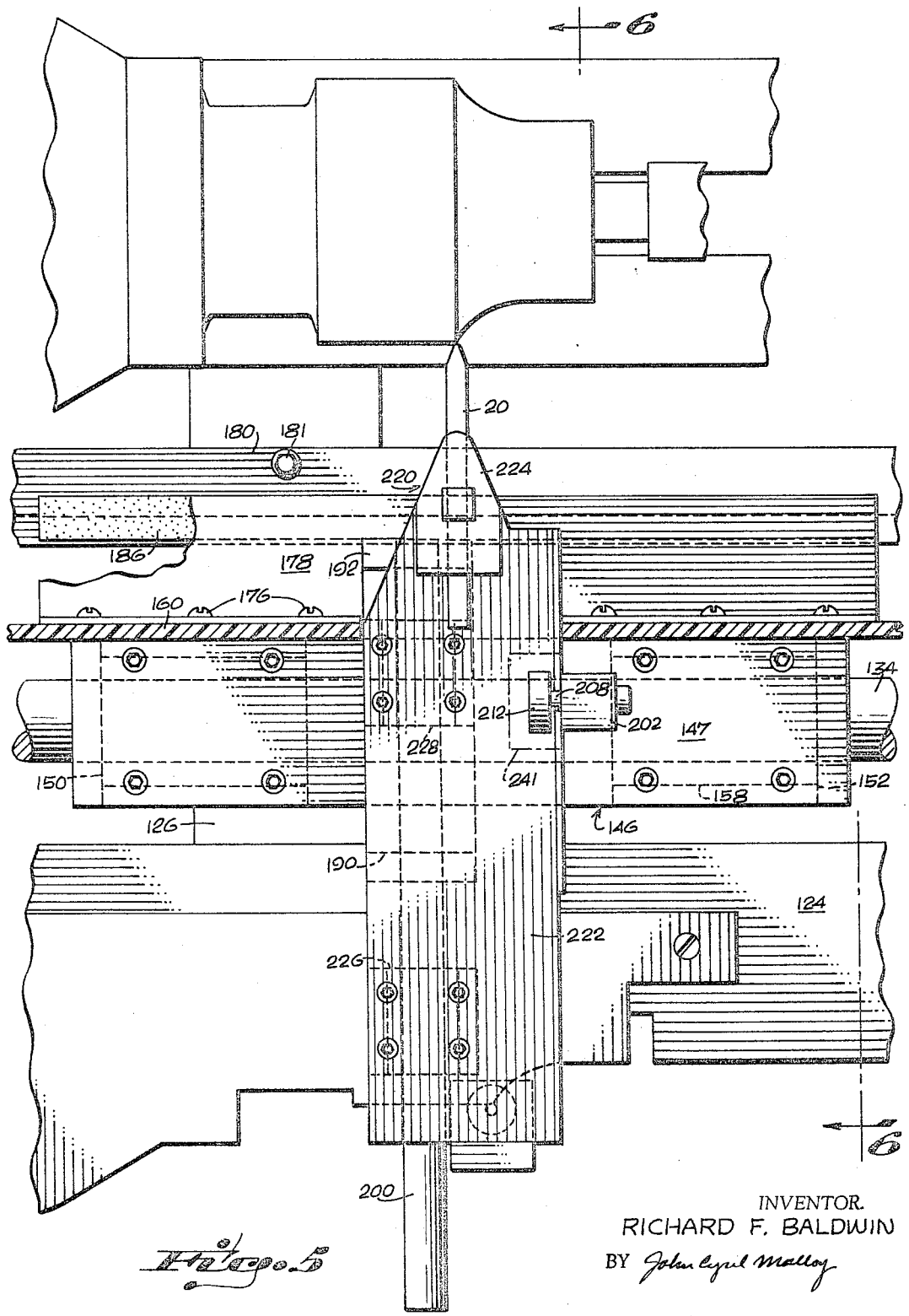

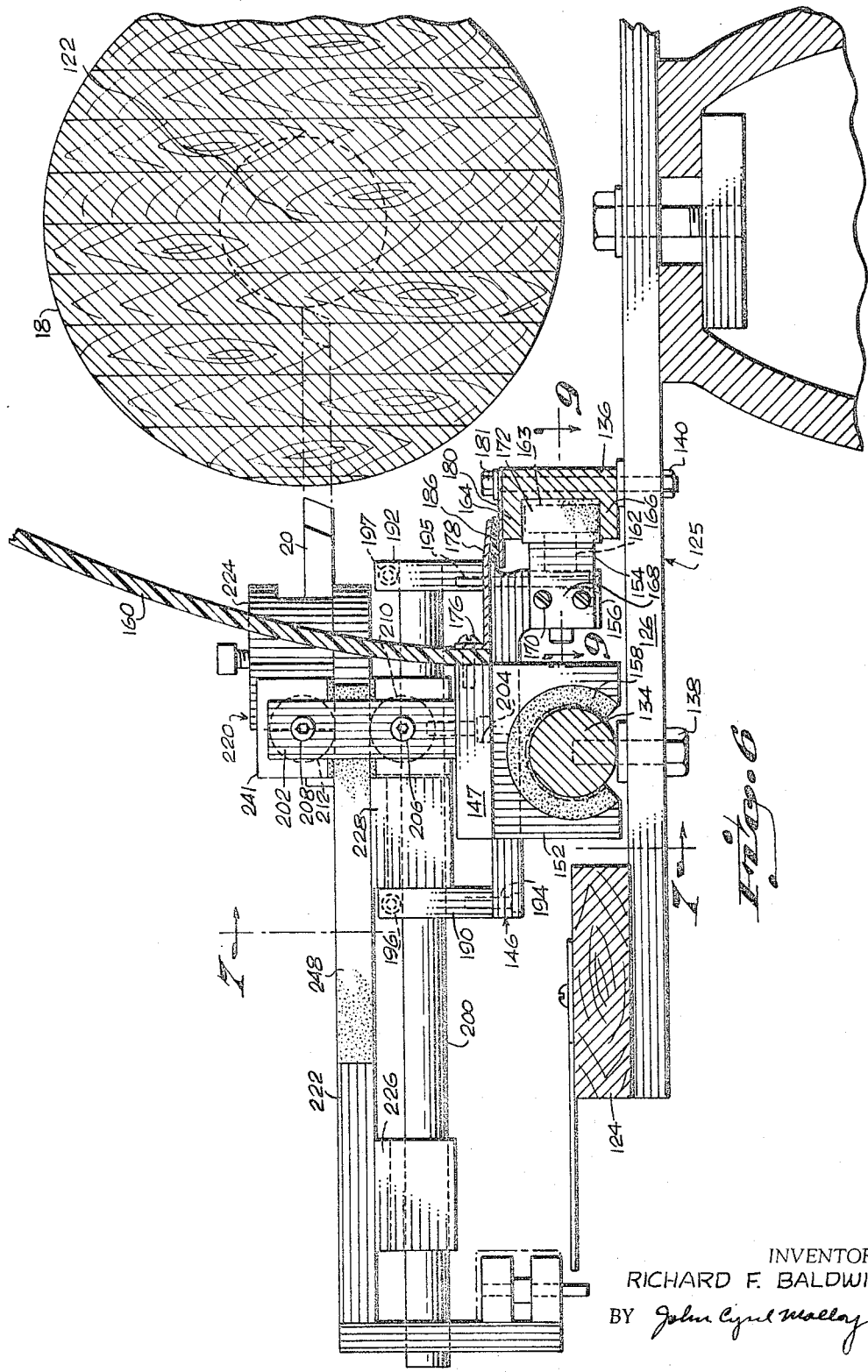

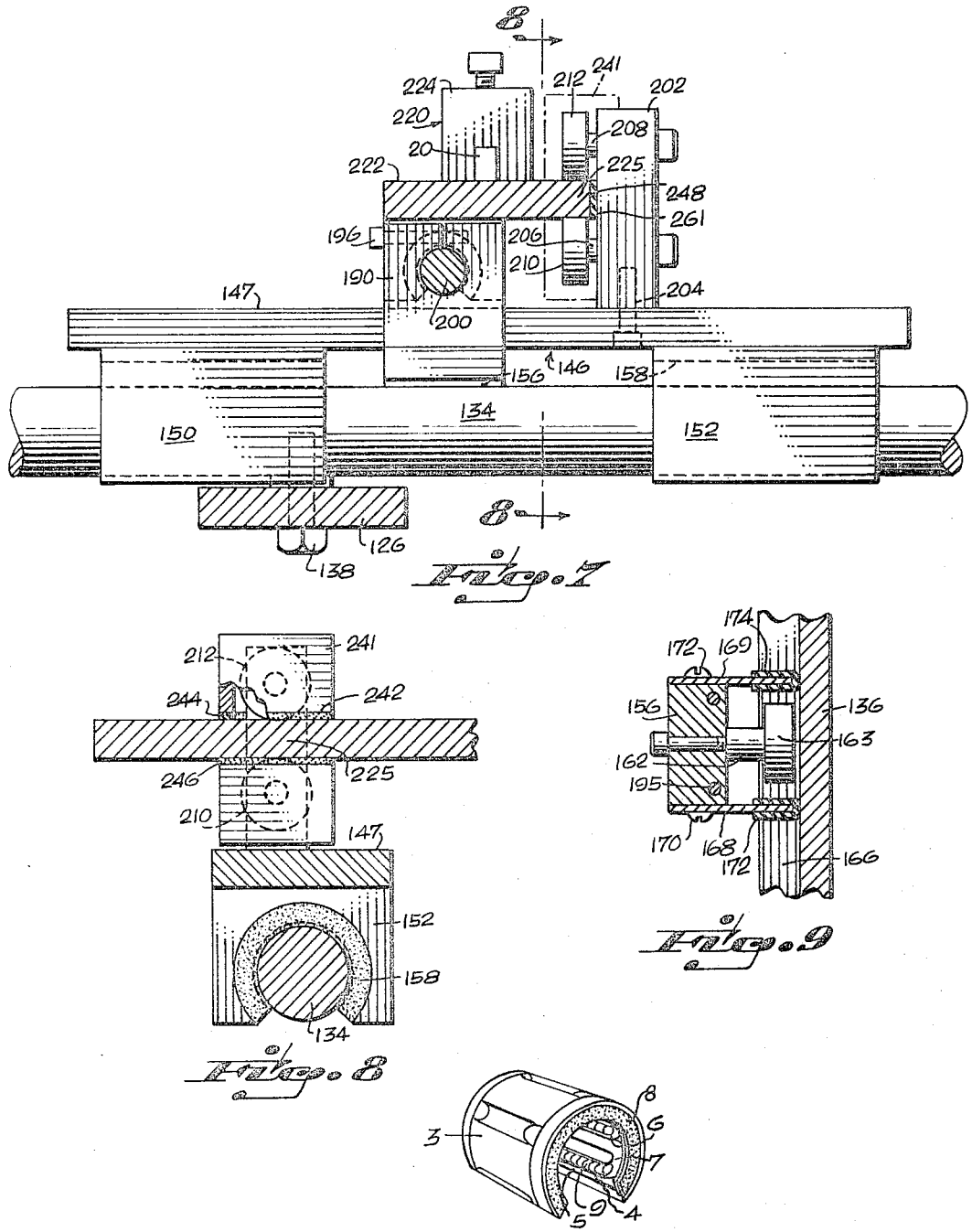

United States Patent Office 3,332,458
Patented July 25, 1967

3,332,458
WOOD TURNING LATHE ATTACHMENT
Richard F. Baldwin, 830 NE. 159th St.,
North Miami Beach, Fla. 33162
Filed June 5, 1964, Ser. No. 373,018
16 Claims. (Cl. 142—7)

This invention relates to wood turning lathes and, more particularly, to an attachment for a wood turning lathe to support a tool in a holding mechanism adapted for movement longitudinally with respect to the lathe and transversely in a limited direction with respect to the lathe.

In the past, attachments for wood working lathes have been invented which provide for movement of a tool for working a piece of wood stock revolving about the working center-line of a lathe wherein the tool is adapted to be moved with respect to a pattern or template. For instance, in U.S. Letters Patent No. 2,880,776, a pair of parallel bars, one of which is on each side of the main center-line of the lathe, are provided to support a tool-holding member for movement in a direction parallel to the working center-line of the lathe. It has been found, however, that the prior art attachments have not provided structural rigidity sufficient for continuous production use which requires relative precision.

It is, accordingly, an object of this invention to provide an attachment for a wood turning lathe which is adapted to be rigidly fixed to a wood turning lathe and to support a tool-holding mechanism upon a rigid balanced framework for guided movement longitudinally with respect to a piece of wood stock revolving about the working center-line of the lathe and transversely to a predetermined path defined by a template wherein the guide means are on one side of the lathe and support the tool against forces or stresses tending to cause a torque on the tool and holding mechanism arising from engagement of the tool with the rotating wood stock.

It is a general object of this invention to provide a wood turning lathe for removing wood from a piece of stock revolving on a working center-line which includes a rigid frame for attachment to extend outwardly in a transverse direction from one side of the lathe with a carriage, movable longitudinally with respect to the lathe and supported by spaced, parallel longitudinally-extending guide means on the frame and a tool-holding mechanism slidably mounted on a parallel transverse guide means carried by the carriage so as to be adapted to move a tool inwardly and outwardly with respect to the working center-line of the lathe.

It is a general object of this invention to provide a wood turning lathe attachment including a frame, supporting a carriage movable longitudinally with respect to the lathe and carrying a tool-holding mechanism on the carriage movable in a transverse direction with respect to the lathe, the attachment including dual pairs of parallel guide means, one pair of the guide means being on the frame for guiding movement of the carriage and the other guide means being on the carriage for guiding the tool-holding mechanism.

It is another object of this invention to provide a lathe attachment for a wood working lathe carrying a first longitudinal guide means for a carriage movable longitudinally therealong and a second guide means on the carriage for a tool-holding mechanism movable on the second guide means in a transverse direction with respect to the lathe, wherein the tool-holding mechanism includes a follower mechanism to guide a tool in the tool-holding mechanism to a predetermined path when a template is mounted to the attachment.

It is another object of this invention to provide a lathe attachment for a wood working lathe carrying a first longitudinal guide means for a carriage movable longitudinally therealong and a second guide means on the carriage for a tool-holding mechanism movable on the second guide means in a transverse direction with respect to the lathe, wherein means are provided on the carriage and on the tool-carrying mechanism to sweep the guide means on movement of the carriage and mechanism respectively to prohibit chips from lodgment between the guide means and the carriage or member.

It is another object of this invention to provide a lathe attachment for a wood working lathe carrying a first longitudinal guide means for a carriage, which carriage is movable longitudinally with respect to the lathe, and a second transverse guide means on the carriage for a tool-holding mechanism movable on the second guide means in a transverse direction with respect to the lathe wherein the guide means are adapted to rigidly support the tool-holding mechanism and balance it against forces or stresses tending to cause a torque arising from engagement of the tool with a rotating piece of wood stock in the lathe.

In accordance with these and numerous other objects which become apparent hereinafter, the instant invention will now be described with reference to the accompanying drawings.

In the drawings:

FIG. 2 is a side view of FIG. 1 partly in cross section taken along the line 2—2 of FIG. 1, looking in the direction of the arrows, and illustrating the tool in a withdrawn position;

FIG. 3 is a partial front elevation view of the lathe attachment;

FIG. 4 is a cross-sectional view taken along the line 4—4 of FIG. 2 and looking in the direction of the arrows;

FIG. 5 is a partial plan view of an alternative attachment for a wood turning lathe illustrating the tool movably carried on the attachment in engagement with a piece of wood stock in the lathe;

FIG. 6 is a partial side elevation view, partly in cross-section, of the embodiment of FIG. 5 which view is taken along the line 6—6 of FIG. 5 looking in the direction of the arrows;

FIG. 7 is a partial front elevation view, partly in cross section, which is taken along the line 7—7 of FIG. 6;

FIG. 8 is a partial cross-sectional view taken along the line 8—8 of FIG. 7 and looking in the direction of the arrows;

FIG. 9 is a partial cross-sectional view taken along the line 9—9 of FIG. 6 and looking in the direction of the arrows; and FIG. 10 is a perspective view of a ball-type bushing suitable for incorporation in the attachments between the guide means and the carriage and tool-holding mechanism as is described more fully hereinafter.

Figure 1:
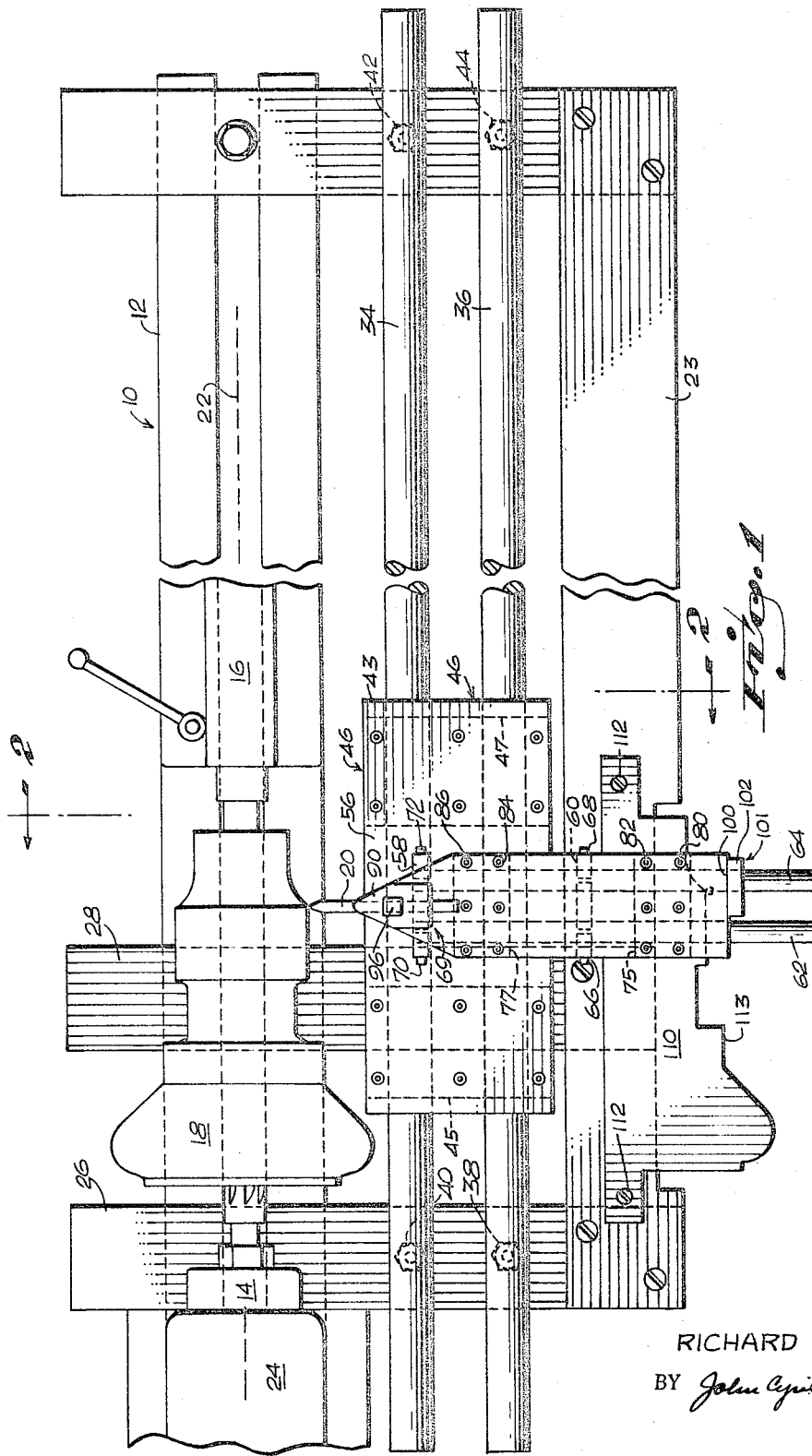
FIG. 1 is a partial plan view of a wood turning lathe provided with the instant attachment illustrating the tool movably carried by the attachment in engagement with a piece of wood stock in the lathe.

Referring first to FIGS. 1–4 of the drawings, wherein like reference characters designate like or corresponding parts throughout these views, and referring particularly to FIG. 1, the numeral 10 generally designates a wood turning lathe including a base 12, FIGS. 3 and 4, and the conventional head and tail pieces, or opposed end pieces, 14 and 16 respectively to rotatably support a piece of wood stock 18 between rotating centers for working by a tool 20. The piece is adapted to be rotated about an axis therethrough coincident with the working center-line 22 of the lathe by any suitable drive means, such as that generally indicated by the numeral 24.

As best seen in FIG. 2, the lathe attachment comprises (a) a frame 25, supporting (b) a carriage 46 movable longitudinally with respect to the lathe, (c) a tool-holding mechanism 69 on the carriage movable in a transverse direction with respect to the lathe and (d) dual guide means (1) on the frame for the carriage and (2) on the carriage for the tool-holding mechanism.

The frame is removably fastened to the lathe and includes a skirt 23 extending outwardly from one side of the lathe, the skirt being rigidly supported by spaced arms 26 and 28 which are rigidly attached to the base 12, such as by a through bolt 30 in FIG. 2 passing both through the arm and a threaded clamp block 32 drawn tightly against the base 12. The guide means for the carriage comprise a pair of spaced, parallel bars 34 and 36, which are parallel to the working center-line of the lathe and bridge the two arms intermediate the working center-line 22 and the skirt 23. The bars are rigidly attached to the arms by suitable means such as the bolts 38 and 40 of FIG. 2 and 42 and 44 which can be seen in FIG. 1 which are received in threaded recesses in the bars. The carriage 46 includes a top member 43, two depending slide blocks 45 and 47 and a support for the tool-holding mechanism. The carriage 46 is supported on the bars 34 and 36 for sliding linear motion thereon and suitable means for supporting the carriage are four ball-type bushings carried in the blocks of the carriage, such as that shown in FIG. 10. Two ball-type bushings are connected to each bar, such as 48 and 50 of FIG. 2. Referring to FIG. 10, satisfactory ball-type bushings are of the type which provide a plurality of oblong circuits 6 and 7 for recirculating balls, such as 9 therein with one of the straight sides of each of the circuits, such as 4, permitting ballbearing contact between the inner surface 5 of the bearing sleeve 3 and the shaft. The bushings may be retained in end recesses 52 and 54 of the slide block of the carriage by any suitable means such as a shrink fit, an end cover plate, or a conventional retaining ring. An end cover plate for each of the bushings with a bar engaging inner lip 8 of neoprene or similar material may be provided to sweep the bars of chips as they move along them. As best seen in FIG. 2, two rod-holding clamps are rigidly mounted to the upper surface 56 of the member 43 of the carriage 46, an inner clamp 58 and an outer clamp 60. Each of the clamps, such as the outer clamp 60 of FIG. 3, includes a pair of holes or seats to accommodate and rigidly support a pair of spaced, transverse, parallel rods 62 and 64, thus, connecting the rods for movement with the carriage. Tightening bolts 66 and 68 and 70 and 72 are provided on the respective rod-holding clamps to tightly hold the parallel rods 62 and 64 in a fixed position relative to the carriage. Thus, the carriage is supported for sliding linear movement longitudinally along the bars.

The tool-holding mechanism generally designated 69, includes a platform 74, depending bearing blocks 75 and 77, and a tool holder 90. The tool-holding mechanism is supported on the transverse rods 62 and 64 for sliding linear motion therealong. In the embodiment shown, a plurality of ball-type bushings of the type described above are employed to support the tool-holding mechanism, the bushings being housed in the bearing blocks and being designated by the numerals 76 and 78 in FIG. 3, which are the outer ball-bearing bushings. Two inner bushings, not shown, are carried in the innermost block 77. As can be seen in FIG. 2, the platform 74 is attached to the bearing blocks by means of a plurality of bolts 80, 82, 84 and 86 and their counter-parts seen immediately to the left of each of these bolts in FIG. 1. Thus, the tool-holding mechanism 69 is supported for linear sliding movement in a transverse direction to that of the working center-line 22 of the lathe. As can be seen in FIG. 2, the block 77 is limited in sliding travel between the clamps 58 and 60 and the block 75 travels between the outer clamp 60 toward and away from the distal end of the rods 62 and 64. To the upper surface 88 of the platform 74, the tool holder 90 is rigidly fastened by means of bolts 92 and 94 for movement together with the platform and blocks, said tool holder being adapted to adjustably hold the transversely projecting cutting tool 20 by means of the adjustment screw 96 communicating with a through slot 97.

To the outer edge 100 of the platform 74 a template following mechanism 101 is fastened which comprises a depending plate 102 bolted to the end 100 and a follower 106 carried on the lower end 104. The follower includes a sensing finger 108 rotatably journalled to the follower. To the skirt 23 of the frame 12 a pattern or template 110 is adapted to be fastened by means of screws 112 to cooperate with the rotatable sensing finger 108 to guide movement of the tool-holding mechanism generally and the cutter particularly to a final predetermined path in a manner now to be described.

In operation, a piece of wood 18 is positioned between the end pieces 14 and 16 for turning about the axis 22. The tool-holding mechanism 69 with the tool 20 are then moved as a unit while a transverse force is applied; and, when a longitudinally-directed force is applied, together with the carriage 46 and rods 62 and 64 in a longitudinal direction parallel to the working center-line of the lathe such that the sensing finger 108 will travel along the outer edge 113 of the pattern or template 110 and limit transverse movement. It is to be noted that the provision of parallel bars 34 and 36 to guide the carriage, in combination with the transversely-disposed, parallel rods 62 and 64 to guide the tool-holding mechanism, provide balance against forces or stresses tending to cause a torque which arise from engagement of the tool with the rotating piece 18.

An alternative attachment for a wood turning lathe is illustrated in FIGS. 5–9 of the drawings. The attachment includes (a) a frame 125 removably fastened to the lathe by suitable means, such as that described with reference to FIGS. 1–4 with a skirt 124 supported on one side of the lathe by spaced arms, such as 126, (b) a carriage 146 movable longitudinally with respect to the frame, (c) a tool-holding mechanism 220 carried on the carriage so as to be movable in a transverse direction relative to the lathe, and (d) dual guide means (1) on the frame for the carriage and (2) on the carriage for the tool-holding mechanism.

The guide means for the carriage comprises a pair of spaced, parallel guide means 134 and 136 which are aligned parallel to the working center-line 122 of the lathe and bridge the arms in a position intermediate the working center-line of the lathe 122 and the skirt 124. The outer guide means 134 is a bar and the inner guide means 136 is an outwardly-facing channel section for a purpose to be described. Both of the guide means 134 and 136 are rigidly attached to the arms by suitable means such as the nut and bolt arrangement 138 and 140 of FIG. 6.

The carriage 146 is supported on the guide means 134 and 136 for linear longitudinal motion therealong. The carriage includes a main member 147, depending bearing blocks 150 and 152 fastened to the main member for sliding attachment to the outer guide means 134, a roller means 154 for engagement with the inner guide means 136, and a support for the tool-holding mechanism. On the outer side, the carriage is movably supported on the outer guide means or bar 134 on ball-type bushings such as that designated by the numeral 158 in FIG. 6 which are housed in the bearing blocks such as in the manner described aforesaid with reference to FIGS. 1–4. On the inner side, the carriage is movably supported on the inner guide means 136 by the roller means 154 of FIG. 6 in a manner now to be described. The main member 147 includes a depending inner lip portion 156 having a shaft 162 extending inwardly into the channel of the guide means 136. To the end of the shaft there is journalled a roller 163 for rolling movement along and within the channel between the upper and lower flanges 164 and 166 respectively. A pair of spaced rod-holding clamps 190 and 192 are bolted as at 194 and 195 to the top of the main member 147, the said rod-holding clamps being provided with suitable tightening means such as 196 and 197. Each of the clamps includes a hole or seat which are transversely aligned to receive and rigidly support a transverse rod 200 for movement with the carriage. Also, to the platform 147 an upwardly projecting shaft-holding tower 202 which projects upwardly is fastened by means such as the bolt 204. Two vertically-spaced, relatively short, longitudinally-extending shafts 206 and 208 are carried in the tower. To the end of each shaft, a roller 210 and 212 is journalled for a purpose to be described.

The tool-holding mechanism, generally designated 220, is supported for transverse movement along the rod 200 and relative to the tower between the rollers 210 and 212. The tool-holding mechanism includes a platform 222, a tool holder 224 and a pair of off-set and depending bearing blocks 226 and 228. Each of the bearing blocks 226 and 228 carry ball-type bushings of the type described with reference to FIGS. 1-4 which slidably engage the rod 200. The transversely-extending edge 225 of the platform is received between the rollers 210 and 212 such that the rollers co-act with the edge to support it and permit sliding movement of the platform relative thereto. The tool holder is suitably mounted adjacent the inner edge of the platform, as it is described with reference to FIGS. 1-4 to accommodate a tool. Also, at the outer edge of the platform a template following mechanism is provided of the type described with reference to FIGS. 1-4.

Means are provided to protect the movement of the carriage and the tool-holding mechanism from the deleterious effects of flying chips caused when the lathe is in operation, as well as a shield to protect the operator. Considering the latter first and with reference to FIGS. 5 and 6, a shield 160 is bolted as at 176 along the length of the inner side of the inner marginal edge of the main member 147 of the carriage. The shield is a transparent sheet of plastic which curves upwardly toward the lathe and is provided with a small but suitable hole for the tool-holding mechanism to pass therethrough as required in operation.

The roller 162 of the carriage 147 is provided with a chip-sweeping means as it travels protectively within the channel 136. With reference to FIGS. 6 and 9, it is seen that side plates 168 and 169 are fastened by bolts 170 and 172 to the sides of the lip portion 156 and are arranged such that the distal ends thereof extend into the channel of the guide means 136. To the distal ends brushes 172 and 174 are fastened which sweep the channel between the flanges of the guide means as the roller of the carriage is moved therealong. The top entrance or upper surface of the channel is also protected by means of a foot 178 which is fastened to the main member 147 along the inner length thereof by the bolts 176, as can be seen in FIGS. 5 and 6. The foot is biased to firmly overlay a flat shielding strip 180 exteriorally bolted as at 181 on the upper flange 164 of the channel section for sandwiching a marginal sealing edge 186 between the foot and the strip.

The rollers 210 and 212 carried by the tower are also protectively housed within a protective box 241 best seen in FIG. 8, which is divided into an upper and a lower chamber defined by a slit 242 for receiving the edge 225. The slit facing edges of the box are covered with a protective sealing member such as 244 and 246; and the edge of the platform which projects into the slit is provided with a sealing strip 248, as seen in FIG. 7, to slidably abut the rear 261 of the box.

While the instant inventions have been shown and described herein in what are conceived to be the most practical and preferred embodiments, it is recognized that departures may be made therefrom within the scope of the inventions, which are therefore not to be limited to the details disclosed herein but are to be accorded the full scope of the claims so as to embrace any and all equivalent apparatus and articles.

What is claimed is:

1. An attachment for use in combination with a wood turning lathe for removing wood from a piece of stock revolving on a working center-line comprising; a rigid frame for attachment to the lathe to extend outwardly in a transverse direction on one side of the lathe; a pair of spaced, parallel, longitudinally-extending guide means rigidly supported adjacent the lathe on the frame; and a carriage mounted to the guide means for longitudinal movement along the guide means on one side of the lathe and parallel to the working center-line of the lathe; said carriage including (a) a pair of parallel transverse guide means rigidly supported on the carriage for movement therewith, (b) a tool-holding mechanism slidably mounted on the transverse guide means for transverse movement inwardly toward and outwardly away from the said centerline, and (c) spaced anti-friction means for movement therewith to engage said longitudinally-extending guide means at a plurality of spaced points to movably support the carriage for longitudinal movement therealong.

2. An attachment for use in combination with a wood turning lathe for removing wood from a piece of stock revolving on a working center-line comprising; a rigid frame for attachment to the lathe to extend outwardly in a transverse direction on one side of the lathe, a first pair of longitudinally extending parallel guide means rigidly supported on the frame and aligned with the center-line when the attachment is mounted to the lathe; a carriage mounted to the guide means for longitudinal movement therealong on one side of the lathe; said carriage including a second pair of transversely extending parallel guide means rigidly supported on the carriage, and a transparent upwardly and a longitudinally-aligned shield to deflect flying chips; and a tool-holding mechanism slidably mounted on the transverse guide means for transverse movement inwardly toward and outwardly away from the said center-line.

3. An attachment for use in combination with a wood turning lathe as set forth in claim 2 wherein the frame includes a skirt adjacent the outer edge thereof adapted for mounting a template therealong, and the tool-holding mechanism includes a follower mechanism arranged to travel along a template mounted on the skirt to guide a tool carried by the mechanism to a predetermined path defined by the template when a force is applied to the mechanism in a longitudinal direction and to limit transverse movement of the mechanism under a transversely directed force.

4. An attachment for use in connection with a wood turning lathe as set forth in claim 3 wherein the follower mechanism includes a depending plate with a bearing mounted adjacent to the distal end of the plate and a sensing finger journalled in the bearing, said sensing finger being arranged to travel to and along a predetermined path on a template mounted to the skirt.

5. An attachment for use in combination with a wood turning lathe as set forth in claim 2 wherein the longitudinally extending guide means comprises a pair of spaced parallel bars.

6. An attachment for use in combination with a wood turning lathe for removing wood from a piece of stock revolving on a working center-line comprising, a rigid frame for attachment to the lathe to extend outwardly in a transverse direction on one side of the lathe; a pair of spaced, parallel longitudinally-extending guide means rigidly supported adjacent the lathe on the frame; said longitudinal extending guide means comprising a pair of spaced parallel bars; a carriage mounted to the guide means for longitudinal movement along the guide means on one side of the lathe and parallel to the working center-line of the lathe; said carriage including a pair of parallel transverse guide means rigidly supported on the carriage for movement therewith, and a tool-holding mechanism slidably mounted on the transverse guide means for transverse movement inwardly toward and outwardly away from the said center-line; said carriage including a first and a second bearing block with two ball-type bushings housed in each block arranged for movement therewith and such that one of the bushings in each block slidably engages one of the said bars to movably support the carriage for longitudinal movement therealong.

7. An attachment for use in combination with a wood turning lathe as set forth in claim 6 wherein each of the said bushings includes a bar sweeping member which slidingly engages the bars to sweep wood chips clear as the carriage moves therealong prohibiting entrance thereinto.

8. An attachment for use in combination with a wood turning lathe as set forth in claim 6 wherein a pair of spaced rod holding clamp means are provided on the carriage to support the transverse guide means for rigid movement with the carriage, said guide means comprising a pair of transversely extending and spaced parallel rods.

9. An attachment for use in combination with a wood turning lathe as set forth in claim 8 wherein the tool-holding mechanism includes a first and a second bearing block with two ball-type bushings in each block such that one of the bushings in each block engages one of said rods to slidingly support the tool-holding mechanism on the rods for transverse movement along the said guide means.

10. An attachment for use in combination with a wood turning lathe as set forth in claim 9 wherein the bushings movably connecting the tool-holding mechanism and said rods includes a rod sweeping member to sweep chips clear as the tool-holding mechanism moves therealong.

11. An attachment for use in combination with a wood turning lathe as set forth in claim 2 wherein a first and a second sweeping and cleaning means are carried on the carriage and tool-holding mechanisms, respectively, to sweep the longitudinally extending guide means and the transverse guide means on respective movement of the carriage and mechanism to prohibit chips from lodgment between the said guide means and the carriage and member.

12. An attachment for use in combination with a wood turning lathe as set forth in claim 3 wherein a first and a second sweeping and cleaning means are carried on the carriage and tool-holding mechanisms, respectively, to sweep the longitudinally extending guide means and the transverse guide means on respective movement of the carriage and mechanism to prohibit chips from lodgment between the said guide means and the carriage and member.

13. For inclusion in an attachment for a wood working lathe including a frame adapted to be rigidly affixed to the lathe and having a parallel spaced first and second member supported on the frame in longitudinal alignment with the lathe when the frame is attached thereto; a carriage adapted to be movably mounted to the members for linear longitudinal movement therealong, a pair of transverse guide means connected to the carriage for movement therewith, means movable on both of the transverse guide means to support a tool-holding mechanism; said carriage including means rigidly connected to the carriage and adapted to be connected to said first member to prohibit relative transverse movement between the carriage and said first member, wherein said second member is of channel section with the flanges extending toward said carriage and wherein the carriage includes a member movably received in the channel of the second member and side brushes slidably received in the channels in abutting engagement with the confronting surfaces of the flanges to sweep the channel on each side of the member received in the channel as the carriage moves therealong.

14. A carriage as set forth in claim 13 wherein a shielding member overlays the top flange of the channel and the carriage includes an extension overlaying the shielding member to restrict passage of chips between the extension of the carriage and the shielding member.

15. For inclusion in an attachment for a wood working lathe including a frame adapted to be rigidly affixed to the lathe and having a parallel spaced first and second member supported on the frame in longitudinal alignment with the lathe when the frame is attached thereto; a carriage adapted to be movably mounted to the members for linear longitudinal movement therealong, a pair of transverse guide means connected to the carriage for movement therewith, means movable on each of the transverse guide means to support a tool holding mechanism and said carriage including a transparent shield upwardly curved toward the lathe to deflect flying chips.

16. An attachment for a wood working lathe adapted to be rigidly fastened to the lathe on one side including a first pair of spaced longitudinally extending and aligned guide means on one side of the working center-line of the lathe when the attachment is fastened to the lathe; a carriage including means engaging the said first pair of guide means to support the carriage for longitudinal movement of planar translation relative thereto on one side of the center-line; and said carriage including a second pair of guide means mounted thereto; and a tool-holding mechanism movably connected to the second pair of guide means for movement of translation therealong; said guide means restricting movement of the mechanism and constraining it to movement in a transverse direction only relative to the carriage and said carriage including spaced anti-friction means to engage the said first pair of guide means at a plurality of spaced points to support the carriage for said planar longitudinal movement.

References Cited
UNITED STATES PATENTS

| 1,673,163 | 6/1928 | Schmelzkopf | 82—32 |
| 1,859,474 | 5/1932 | Shawver | 142—38 |
| 1,965,728 | 7/1934 | Tautz | 142—38 |
| 2,068,625 | 1/1937 | Burton | 142—38 |

WILLIAM W. DYER, JR., *Primary Examiner.*

W. D. BRAY, *Assistant Examiner.*